Patented Nov. 16, 1948

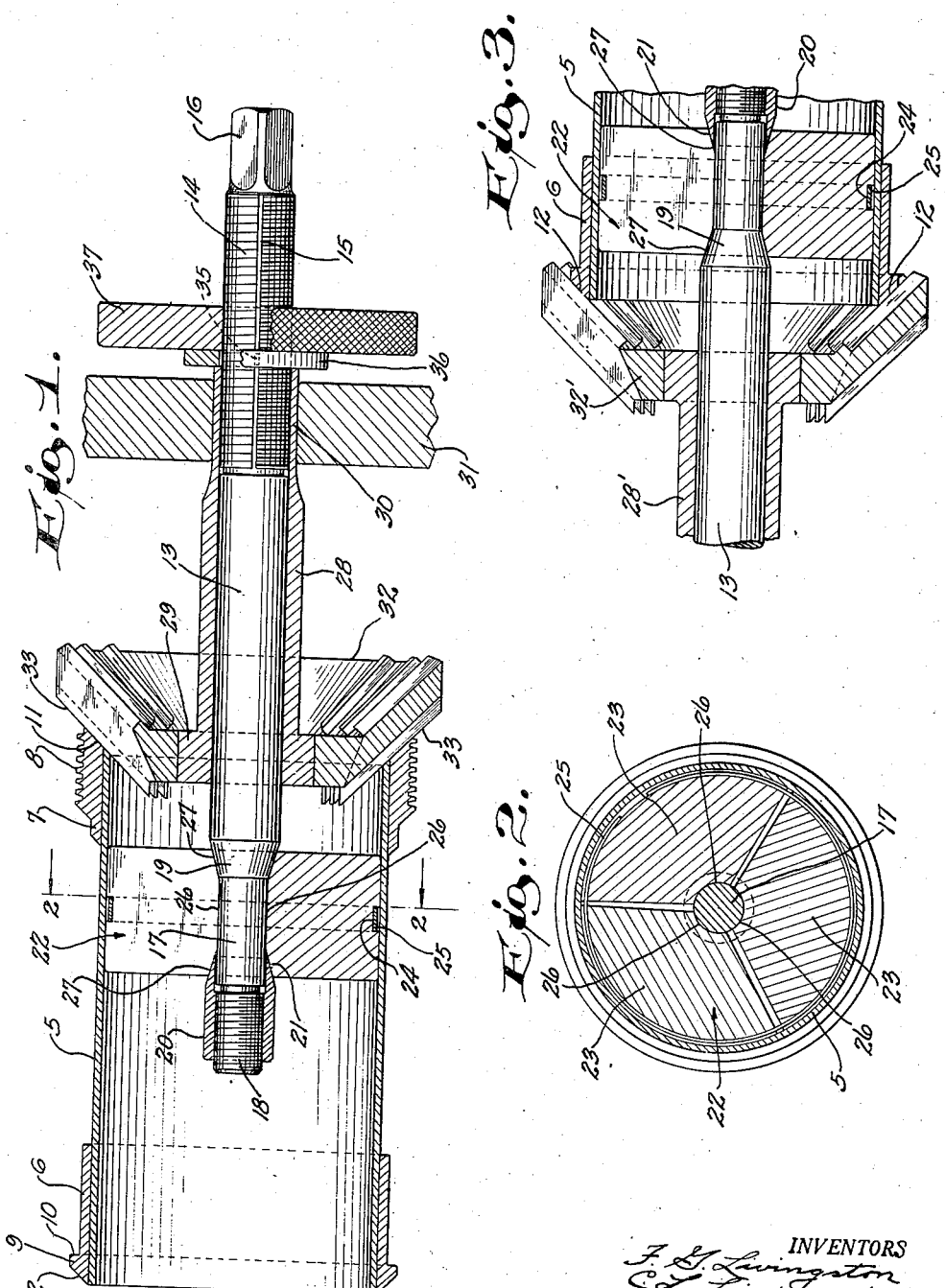

2,453,848

UNITED STATES PATENT OFFICE 2,453,848

FACING TOOL

Francis G. Livingston and Charles L. Livingston, Algona, Iowa

Application March 18, 1946, Serial No. 655,283

1 Claim. (Cl. 90—12)

This invention relates to improvements in facing tools.

In the repair or installation of metal conduits and fittings it is often necessary, while on the job, to perform a facing operation on the end of a tube or fitting in order to provide a seat for a cooperating part. When working in a food plant, such as a dairy, where sanitary fittings are used, it is very important that this work be done smoothly and accurately, and that the seat be properly centered with respect to the tube.

It is a general object of the present invention to provide a relatively small and readily portable facing tool which can be easily and quickly used on the job to perform a selected facing operation on the end of a tube or tubular fitting.

A further object of the invention is to provide a device of the class described which will perform its work accurately, with the cutter always maintained in a properly centered position with respect to the tube.

A still further object of the invention is to provide a facing tool which is adapted for use in conjunction with rotary cutters of various types and sizes, including tapered cutters of the type having teeth positioned to cut an internal tapered seat or of the type having teeth positioned to cut an external tapered seat.

A more specific object of the invention is to provide a facing tool having means engageable with the interior of the tube, without injuring the same, for operatively supporting and centering a cutter.

A further object of the invention is to provide a facing tool as above described wherein tube engaging supporting members of various sizes may be interchangeably used, to adapt the tool for work on tubes of assorted diameters.

Other objects of the invention are to provide a facing tool which is relatively inexpensive to manufacture, which has relatively few parts to get out of order, and which can be operated manually by an inexperienced workman.

With the above and other objects in view, the invention consists of the improved facing tool, and all its parts and combinations, as set forth in the claim, and all equivalents thereof.

In the accompanying drawing, illustrating one complete embodiment of the preferred form of the invention, in which the same reference numerals designate the same parts in all of the views:

Fig. 1 is a longitudinal sectional view through a tubular fitting showing the facing tool in operative relation thereto, some of the parts of the tool being in longitudinal section;

Fig. 2 is a sectional view taken on the line 2—2 of Fig. 1; and

Fig. 3 is a fragmentary longitudinal sectional view showing a fragment of the tool associated with the opposite end of the tube of Fig. 1, the tool being equipped with a cutter of the type which is adapted to cut an external tapered seat as distinguished from the internal tapered seat of Fig. 1.

Referring more particularly to the drawing, the numeral 5 designates a metallic tube. This tube may be of any desired type, but in the drawing it is shown as equipped with a ferrule 6 at one end and with a ferrule 7 at the opposite end. The ferrule 7 is externally threaded as at 8. The ferrule 6 has a portion adjacent its end which is of enlarged diameter as at 9 to provide an annular shoulder 10. It is frequently necessary while on the job to cut an internally tapered seat on one end as at 11, and to cut an external taper on the opposite end as at 12. With the use of the improved tool of the present invention, this type of seat may be very quickly formed in an accurate manner while the cutter is held in centered position with respect to the tube 5.

The tool includes a stem 13 having a threaded portion 14 near one end formed with a longitudinal keyway 15. The extreme outer end of the stem, beyond the threaded portion 14, is preferably squared as at 16 or otherwise formed for cooperation with a wrench or handle.

At its inner end the stem is of reduced diameter as at 17 and threaded as at 18. Between the main portion of the stem and the portion 17 of reduced diameter is an annularly tapered or frusto-conical wedging section 19. A nut 20 which is threaded on the threaded end portion 18 has its inner end of tapered or frusto-conical form as at 21 to form a second annular wedging surface.

A supporting member for the stem is designated generally by the numeral 22. It is formed of a plurality of cooperating sector-shaped sections. It is preferred to use three sector-shaped sections 23, each one being approximately equal to one-third of a circle. The peripheries of the sections 23 are formed with registering grooves 24 which receive a split spring steel band 25. The band is preferably of less thickness than the depth of the groove 24 and serves the function of temporarily holding the sections 23 in assembled position on the stem while the tool and supporting member 22 are being inserted into a tube.

The inner portion of each section 23 has a transversely extending recess 26 which is arcuate in cross-section. When the three sections 23 are in assembled relationship as in Fig. 2, the recesses 26 cooperate to form a center hole. At each end each recess is outwardly flared as at 27 so that the hole formed by the three cooperating recesses 26 has an annular flare at each end, one of which cooperates with the tapered portion 19 of the stem 13 and the other of which cooperates with the tapered portion 21 of the nut 20 as is clear from Fig. 1.

Slidable and rotatable on the stem 13 is a sleeve 28 having a portion 29 of enlarged diameter at one end. At the other end the sleeve is externally squared as at 30 or otherwise formed for cooperation with a center hole in a turning handle 31. In the drawing the ends of the handle 31 are broken off. It is, however, to be understood that these ends extend laterally for a substantial distance so that they may be easily manipulated to cause rotation of the sleeve 28 for a purpose to be hereinafter described.

The portion 29 of the sleeve is rigidly connected to and forms the hub of a cutter 32. Where it is desired to cut tapered seats, as in the drawing, then a tapered cutter of the type illustrated may be used. However, various sleeves, each having a different type of cutter, may be furnished for interchangeable use. The cutter 32 is formed with cutting edges 33 which are used for cutting an internal tapered seat as in Fig. 1.

Slidable on the threaded portion 14 of the stem and having a key 35 for cooperation with the keyway 15 is a washer 36. A threaded feed wheel 37 is threaded onto the portion 14 of the stem to bear against the outer face of the washer 36.

When it is desired to insert the cutter in a tube or tubular fitting, a sectional supporting member or disc 22 of proper diameter for the tube to be operated upon is assembled on the portion 17 of the stem. The nut 20 is then threaded on the inner end of the stem but is not drawn up to such an extent as to cause spreading of the sections 23. These sections are temporarily maintained by the spring steel band 25 in such a position that the member 22 has a minimum diameter.

The supporting member 22 is then inserted into the tube, as is shown in Fig. 1, and a cutter sleeve with a selected cutter is slipped onto the stem. Next, the cutter operating handle 31 is placed in position, then the washer 36, and then the feed wheel 37 is threaded in place. A wrench or other turning tool is then engaged with the end 16, and the stem is rotated to cause the nut 20 to be threaded toward the tapered stem section 19. This causes the two annular tapered sections 21 and 19 to be drawn toward one another and to act on the tapered recess portions 27 of the sections 23 to spread said sections apart and cause the outer periphery of the sections to have an expanding movement into tight contact with the inside of the tube. This operation is continued until the tube is engaged firmly enough to form a proper support for the facing tool. Obviously the apparatus insures accurate centering of the cutter 32 with respect to the tube 5.

Next, the feed wheel 37 is rotated to force the cutting edges 33 of the cutter into proper engagement with the part to be cut. Then, by rotating the cutter, through manipulation of the handle 31, and by turning the feed wheel 37 at intervals, the facing operation may be quickly performed. The final result, when the parts are arranged as in Fig. 1, is to cut the internally tapered seat 11.

To cut an external taper as at 12, the supporting disc 22 is inserted into the opposite end of the tube as in Fig. 3, and a sleeve 28' having a tapered cutter 32', which is reversely positioned on the sleeve from the cutter 32, is substituted. The tool is then used in the same manner as heretofore described, and the final result is the cutting of the tapered external seat 12.

While only two interchangeable cutters have been illustrated, it is obvious that various other types and sizes of cutters may be furnished.

To remove the tool after a facing operation has been performed, it is merely necessary to rotate the stem 13 at the head 16 in a direction to cause a loosening of the nut 20. After the wedging surfaces 19 and 21 have been drawn a sufficient distance apart the tool may be readily withdrawn from the tube.

It is clear from the above that the improved facing tool can be inexpensively manufactured, that it only has a few parts of a type which are not likely to get out of order, and that it can be easily operated by a relatively inexperienced man.

It is also apparent that the construction is such as to provide for accurate centering of the cutter with respect to the work.

Various changes and modifications may be made without departing from the spirit of the invention, and all of such changes are contemplated as may come within the scope of the claim.

What we claim is:

A facing tool for operating on a tubular member comprising a stem having an annular wedging surface spaced from an end, a nut threaded on said end and having its end which faces the annular wedging surface of the stem formed with an annular wedging surface, said stem having its opposite end formed with a relatively long threaded section, a supporting member in which said stem is centered surrounding the portion of the stem between said two annular wedging surfaces, said supporting member being formed of a plurality of sector-shaped sections and said stem being rotatable to cause movement of said nut and annular wedging surface thereof toward the annular wedging surface of the stem and expansion of the sections into tight engagement with the interior wall of the tubular member to be faced, a relatively long sleeve slidably and rotatably mounted on an intermediate portion of said stem, a cutter rigidly connected to one end of said sleeve and rotatable in response to rotation of the latter, a handle at the opposite end of the sleeve, a feed wheel threaded on the relatively long threaded section of the stem outwardly of the sleeve, and a washer slidably and non-rotatably surrounding the stem between the feed wheel and sleeve and engaged by the feed wheel to feed the cutter toward the work when the feed wheel is turned, the portion of the stem outwardly of the feed wheel being accessible for manipulation to cause rotation of the stem.

FRANCIS G. LIVINGSTON.
CHARLES L. LIVINGSTON.

REFERENCES CITED

The following references are of record in the file of this patent:

UNITED STATES PATENTS

| Number | Name | Date |
|---|---|---|
| 1,160,625 | Long | Nov. 16, 1915 |
| 1,972,022 | Le May | Aug. 28, 1934 |
| 2,211,183 | Tytus et al. | Aug. 13, 1940 |
| 2,351,217 | Kopp | June 13, 1944 |